United States Patent
Turbahn et al.

(10) Patent No.: US 8,787,113 B2
(45) Date of Patent: Jul. 22, 2014

(54) VOICE AND POSITION LOCALIZATION

(75) Inventors: Oded Turbahn, Haifa (IL); Michael Kokarev, Haifa (IL); Nathan Altman, RaAnana (IL); Meir Agassy, Ramat-Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 1011 days.

(21) Appl. No.: 12/596,468

(22) PCT Filed: Apr. 18, 2008

(86) PCT No.: PCT/EP2008/054721
§ 371 (c)(1),
(2), (4) Date: Oct. 19, 2009

(87) PCT Pub. No.: WO2008/128989
PCT Pub. Date: Oct. 30, 2008

(65) Prior Publication Data
US 2010/0110273 A1    May 6, 2010

Related U.S. Application Data

(60) Provisional application No. 60/907,846, filed on Apr. 19, 2007.

(51) Int. Cl.
*G01S 3/80* (2006.01)
*G01S 11/14* (2006.01)

(52) U.S. Cl.
CPC ..................................... *G01S 11/14* (2013.01)
USPC .......................................................... 367/118

(58) Field of Classification Search
USPC .......................................................... 367/118
See application file for complete search history.

(56) References Cited

U.S. PATENT DOCUMENTS

| 4,833,637 | A | * | 5/1989 | Casasent et al. | 708/816 |
|---|---|---|---|---|---|
| 5,446,701 | A | * | 8/1995 | Utke et al. | 367/118 |
| 5,469,851 | A | * | 11/1995 | Lipschutz | 600/447 |
| 6,577,299 | B1 | | 6/2003 | Schiller et al. | |
| 6,602,194 | B2 | * | 8/2003 | Roundhill et al. | 600/443 |
| 6,925,296 | B2 | * | 8/2005 | Mattisson | 455/355 |

(Continued)

FOREIGN PATENT DOCUMENTS

| EP | 2147567 | 1/2010 |
|---|---|---|
| GB | 2388077 A | 11/2003 |

(Continued)

OTHER PUBLICATIONS

Examiner's Report Dated Dec. 2, 2010 From the Australian Government, IP Australia Re. Application No. 2008240722.
International Preliminary Report on Patentability Dated Oct. 19, 2009 From the International Preliminary Examining Authority Re.: Application No. PCT/EP2008/054721.

(Continued)

*Primary Examiner* — Isam Alsomiri
*Assistant Examiner* — James Hulka
(74) *Attorney, Agent, or Firm* — Haynes and Boone, LLP

(57) ABSTRACT

Apparatus configured for processing of both audible and ultrasonic sound inputs, including a sensor with a frequency response spanning both audible and ultrasonic frequencies, and processing electronics configured to separate the audible and ultrasonic input frequencies for independent use. Apparatus configured for processing of both audible and ultrasonic sound inputs, including a sensor with a frequency response spanning both audible and ultrasonic frequencies, and processing electronics configured to process each one of the audible and ultrasonic input frequencies independently. Related apparatus and methods are also described.

26 Claims, 6 Drawing Sheets

(56) References Cited

U.S. PATENT DOCUMENTS

| | | | |
|---|---|---|---|
| 7,852,318 B2 | 12/2010 | Altman | |
| 8,546,706 B2 | 10/2013 | Altman et al. | |
| 2002/0035328 A1* | 3/2002 | Roundhill et al. | 600/443 |
| 2002/0123685 A1* | 9/2002 | Miwa et al. | 600/437 |
| 2003/0071798 A1 | 4/2003 | Baron et al. | |
| 2006/0077188 A1 | 4/2006 | Byun | |
| 2009/0067291 A1* | 3/2009 | Atsmon et al. | 367/118 |
| 2010/0142325 A1 | 6/2010 | Altman et al. | |

FOREIGN PATENT DOCUMENTS

| | | | |
|---|---|---|---|
| JP | 08-271627 | 10/1996 | |
| JP | 08271627 A * | 10/1996 | G01S 15/10 |
| JP | 10-293643 | 11/1998 | |
| JP | 10293643 A * | 11/1998 | G06F 3/03 |
| JP | 2001-292497 | 10/2001 | |
| JP | 2002-525591 | 8/2002 | |
| JP | 2002-527926 | 8/2002 | |
| JP | 2003-018696 | 1/2003 | |
| JP | 2005522708 A | 7/2005 | |
| WO | WO 00/21203 | 4/2000 | |
| WO | WO-03088136 A2 | 10/2003 | |
| WO | WO 2004/010275 | 1/2004 | |
| WO | 2005111653 A2 | 11/2005 | |
| WO | WO 2007/004119 | 1/2007 | |
| WO | WO-2008111011 A2 | 9/2008 | |
| WO | WO 2008/128989 | 10/2008 | |

OTHER PUBLICATIONS

International Search Report and the Written Opinion Dated Aug. 6, 2008 From the International Searching Authority Re.: Application No. PCT/EP2008/054721.
Translation of Notice of Reason for Rejection Dated Apr. 20, 2012 From the Japanese Patent Office Re. Application No. 2010-503517.
Translation of Office Action Dated Apr. 6, 2012 From the State Intellectual Property Office of the People's Republic of China Re. Application No. 200880020523.5.
Response Dated Dec. 1, 2011 to Examiner's Report of Dec. 2, 2010 From the Australian Government, IP Australia Re. Application No. 2008240722.
Examination Report Dated Apr. 12, 2011 From the Intellectual Property Office of New Zealand Re. Application No. 581214.
Response Dated Dec. 19, 2011 to Examiner's Report of Dec. 2, 2010 From the Australian Government, IP Australia Re. Application No. 2008240722.
Response Dated Nov. 9, 2011 to Examination Report of Apr. 12, 2011 From the Intellectual Property Office of New Zealand Re. Application No. 581214.
Communication Pursuant to Article 94(3) EPC Dated Jul. 12, 2010 From the European Patent Office Re. Application No. 08749602.2.
Communication Under Rule 71(3) EPC Dated Oct. 11, 2012 From the European Patent Office Re. Application No. 08749602.2.
European Search Report and the European Search Opinion Dated Oct. 22, 2012 From the European Patent Office Re. Application No. 12175659.7.
Office Action Dated Jun. 28, 2012 From the Israel Patent Office Re. Application No. 201631 and Its Translation Into English.

* cited by examiner

VOICE AND POSITION LOCALIZATION

RELATED APPLICATION/S

This application is a PCT application claiming priority from U.S. Provisional Patent Application No. 60/907,846 of Turbahn, filed on 19 Apr. 2007.

The contents of the above document are incorporated by reference as if fully set forth herein.

FIELD AND BACKGROUND OF THE INVENTION

The present invention, in some embodiments thereof, relates to providing audio applications and ultrasonic applications through the same microphones and, more particularly, but not exclusively, to carrying out simultaneous noise cancellation and stylus localization on the sonic and ultrasonic signals respectively.

One example of use of noise cancellation is in teleconference equipment. When a voice of a speaker is localized by a microphone, noise arising from directions other than the speaker is attenuated, producing better quality transmission of the speaker's voice. Other examples of noise cancellation use special microphones which subtract peripheral noise from a voice entering the front of the microphone. In voice applications a popular microphone type is a condenser microphone.

Stylus localization using sound waves requires a more accurate localization than that achieved by audio wavelengths, in addition to the fact that an ultrasound stylus does not annoy users with audible noise. Better localization can be achieved by using shorter audio wavelengths, that is, ultrasonic wavelengths, but it is noted that condenser microphones do not have good sensitivity to ultrasonic frequencies. On the other hand, ultrasonic sensors usually have poor sensitivity in the sonic band.

PCT Patent Application No. IB 2008/050946 of Altman et al, describes an ultrasonic acoustic positioning system using a MEMS (Micro Electro-Mechanical Systems) microphone.

Existing products and technologies which process sound typically have separate sensors for ultrasound and for voice applications.

Additional background art includes:

PCT Published Patent Application No. WO2004010275, which describes position information input into an information processing system in, e.g. a mobile communication terminal. The system comprises a plurality of microphones located at known microphone positions and connected to processing circuitry capable of interpreting sound signals from the microphones. A sound signal is received from each microphone, the signals originating from an acoustic wave emanating from an acoustic sound source located at a first position. A respective difference in distance between the sound source at said first position and respective microphone is then calculated, followed by a calculation, using a geometric model, of an estimate of said first position, said estimate being position information intended for use in the information processing system.

UK Patent GB2388077 describes a stylus which contains an ultrasound transmitter for transmitting position signals and a second transmitter for transmitting a timing signal which may be infrared. A detector assembly has position signal receivers (condenser microphones) and a timing signal receiver on a base appliance which also contains hardware and firmware to enable the stylus or an eraser to be tracked on writing surfaces, such as whiteboards, blackboards, flip charts or tablet PCs. It also has a detachable personality module which contains user-related interactions and/or displays, such as push buttons and LEDs and/or LCDs. The personality module contains logic for communications and stand-alone functions. The detector assembly also has a detachable nameplate. The detector may be used without an external processor to record writing in local storage, for subsequent transfer and display. Alternatively, it may be used with an external display unit.

U.S. Pat. No. 6,577,299 describes a wireless pen apparatus for producing signals representative of writing by a user, including: a wireless pen; a removable cap on the pen; and, when the cap is removed from the pen and placed at a reference position, communicating wave energy between at least one location on the pen and at least one location on the cap for determining the position of the at least one location on the pen with respect to the reference position of the cap, and for producing signals that depend on the determined position of the at least one location on the pen.

US Published Patent Application No. 2003/071798 describes a system for generating digital ink from triangulation data of a stylus comprises an electromagnetic radiation source capable to emit electromagnetic pulses; a first and a second ultrasound detector separated from each other by a known distance; a timer coupled to the radiation source, the first detector, and the second detector, and capable to measure a first elapsed time between emission of an electromagnetic pulse from the radiation source and detection of an ultrasound wave at the first detector, and further capable to measure a second elapsed time between emission of the electromagnetic pulse from the radiation source and detection of an ultrasound wave at the second detector; and a triangulation engine coupled to the timer and the radiation source, the engine capable to instruct the source to emit a plurality of radiation pulses, to triangulate the position of an ultrasound transponder over time based on the first elapsed time, the second elapsed time and the known distance between detectors, and to generate characters based on the triangulation data.

PCT Published Patent Application WO 03/088136 of Altman et al describes a position detection system for use in association with computing applications, the system comprising: a positional element for attaining a position and comprising a first emitter for emitting a substantially continuous ultrasonic waveform decodable to fix said position, and a detector arrangement for detecting said waveform in a manner permitting fixing of said position and outputting said waveform for computation, in a manner retentive of said position fixing ability.

US Published Patent Application No. 2006/077188 discloses a device and method for inputting characters or drawings on a mobile terminal using a virtual screen. To input characters or drawings through a virtual screen, the mobile terminal includes an electronic pen, a virtual screen generator, a position detector for detecting the electronic pen position, and a character recognition algorithm for recognizing a trail as a character. When a signal is input from the electronic pen, the mobile terminal detects the originating position of the signal and its trail. The mobile terminal recognizes the detected trail as a character and generates a virtual screen with the recognized character.

SUMMARY OF THE INVENTION

In some aspects of the present invention, the same sensors are used for picking up both sonic and ultrasonic signals, and output of the sensors provides input to electronics suitable for processing both types of signals.

Sensors for performing simultaneous pickup have recently become available. A non-limiting example of such a sensor is a MEMS microphone, such as made by Knowles Acoustics.

In order to benefit from the broad frequency response of the sensors, one embodiment of the invention uses two filters, one filter for ultrasonic pickup, and one filter for sonic pickup. Filtered signals are processed by a processor configured to implement an audio application, an ultrasonic application, or both.

According to an aspect of some embodiments of the present invention there is provided apparatus configured for processing of both audible and ultrasonic sound inputs, including a sensor with a frequency response spanning both audible and ultrasonic frequencies, and processing electronics configured to separate the audible and ultrasonic input frequencies for independent use.

According to some embodiments of the invention, the frequency response of the sensor is substantially different in the audible frequencies and in the ultrasonic frequencies. According to some embodiments of the invention, the difference is more than 40 dB. According to some embodiments of the invention, the processing electronics is configured to amplify a lower one of a response of the sensor to the audible frequencies and a response of the sensor to the ultrasonic frequencies.

According to some embodiments of the invention, the processing electronics includes independent processing parts for independently processing the separated frequencies.

According to some embodiments of the invention, the processing electronics includes a first filter configured to filter audible frequencies and a second filter configured to filter ultrasonic frequencies. According to some embodiments of the invention, the processing electronics further includes a multiplexer for switching between the separated frequencies. According to some embodiments of the invention, the processing electronics includes a Digital Signal Processor (DSP).

According to some embodiments of the invention, the processing electronics is configured for simultaneous processing of audible and ultrasonic output of the sensor.

According to some embodiments of the invention, the apparatus includes two or more sensors. According to some embodiments of the invention, a same sensor is used for picking up the audible and the ultrasonic sound inputs.

According to some embodiments of the invention, the sensors are MEMS microphones.

According to some embodiments of the invention, the processing electronics is configured for localization of at least one source of the ultrasonic sound input. According to some embodiments of the invention, the processing electronics is configured for localization of at least one source of the audible sound input.

According to some embodiments of the invention, the processing electronics is configured to localize an ultrasonic sound source in three dimensions by comparing the ultrasonic output of more than one sensor.

According to some embodiments of the invention, the processing electronics is configured to track movement of the ultrasonic sound source. According to some embodiments of the invention, the processing electronics is configured to produce output corresponding to the tracking.

According to some embodiments of the invention, the apparatus is included in a cell phone.

According to some embodiments of the invention, the apparatus is further configured for equipment monitoring.

According to some embodiments of the invention, the apparatus is further configured to indicate location of faulty equipment.

According to some embodiments of the invention, the apparatus is further configured to measure distance. According to some embodiments of the invention, the apparatus further includes an ultrasonic sound source. According to some embodiments of the invention, the apparatus is included as part of a distance determination unit in a focusing unit of a camera.

According to some embodiments of the invention, the apparatus is further configured to detect animals emitting ultrasonic sounds. According to some embodiments of the invention, the apparatus is further configured to localize animals emitting ultrasonic sounds.

According to some embodiments of the invention, the apparatus is further configured to simultaneously record sound and perform ultrasonic sound source localization. According to some embodiments of the invention, the ultrasonic sound source localization further includes producing input to a writing application.

According to some embodiments of the invention, the apparatus is configured to perform ultrasonic sound source localization for more than one ultrasonic sound source. According to some embodiments of the invention, ultrasonic sound source localization further includes producing input to more than one writing application.

According to some embodiments of the invention, the apparatus is further configured to indicate location of tags emitting ultrasonic sound. According to some embodiments of the invention, the apparatus is further configured to send a signal to the tags in order to cause the tags to emit ultrasonic sound.

According to an aspect of some embodiments of the present invention there is provided a system including the apparatus and a stylus configured to emit ultrasonic sound. According to some embodiments of the invention, the system further includes a touch-screen, in which placing a tip of the stylus on the touch-screen produces output corresponding to a location of the tip of the stylus on the touch-screen, and moving the tip of the stylus along the touch-screen surface produces output corresponding to the movement of the tip of the stylus along the touch-screen surface.

According to an aspect of some embodiments of the present invention there is provided a system including the apparatus and a pointing device configured to emit ultrasonic sound. According to some embodiments of the invention, the apparatus includes three sensors and produces a localization of the pointing device in three dimensions. According to some embodiments of the invention, the pointing device is a mouse.

According to an aspect of some embodiments of the present invention there is provided apparatus configured for processing of both audible and ultrasonic sound inputs, including a sensor with a frequency response spanning both audible and ultrasonic frequencies, and processing electronics configured to process each one of the audible and ultrasonic input frequencies independently.

According to an aspect of some embodiments of the present invention there is provided a method for processing of both audible and ultrasonic sound inputs, using a sensor with a frequency response spanning both audible and ultrasonic input frequencies for input of audible and ultrasonic sound inputs, and processing electronics for separating the audible and ultrasonic input frequencies for independent use. According to some embodiments of the invention, the sensor includes more than one sensor, and further including calibrating the response to input from at least one of the sensors.

According to some embodiments of the invention, the processing electronics is configured for simultaneous processing of audible and ultrasonic frequencies.

According to an aspect of some embodiments of the present invention there is provided a method for processing of both audible and ultrasonic sound inputs, using a sensor with a frequency response spanning both audible and ultrasonic input frequencies for input of audible and ultrasonic sound inputs, and processing each one of the audible and ultrasonic input frequencies independently. According to some embodiments of the invention, the processing each one of the audible and ultrasonic input frequencies independently includes amplifying one of the audible and ultrasonic input frequencies differently from the other.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
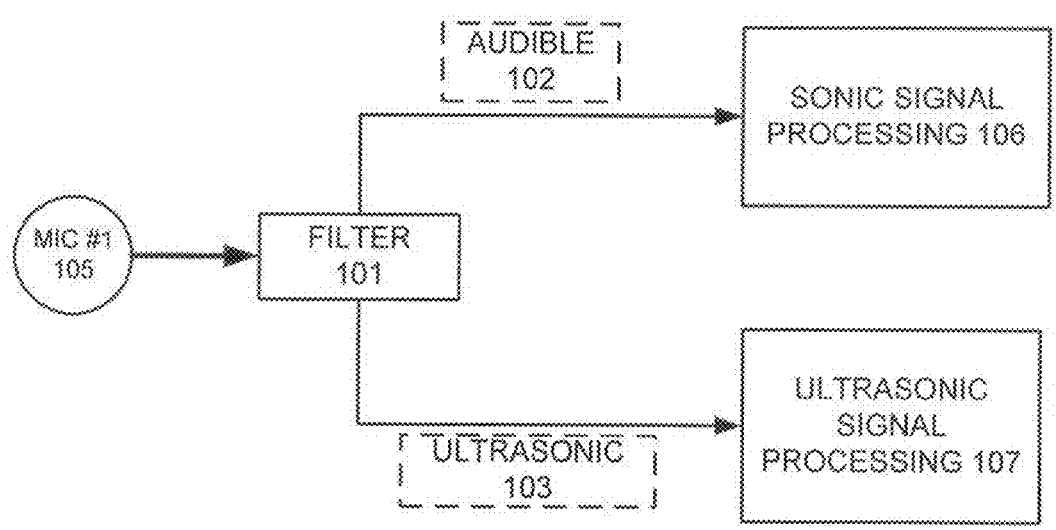
FIG. 1 is a simplified block diagram of an example embodiment of the invention, using a microphone which picks up both audio and ultrasonic signals.

The present invention, in some embodiments thereof, relates to providing audio applications and ultrasonic applications through the same microphones and, more particularly, but not exclusively, to carrying out simultaneous noise cancellation and stylus localization on the sonic and ultrasonic signals respectively.

As was described in the background, microphones for audio applications do not have good sensitivity for ultrasonic applications. Recently, sensors with sensitivity in both audio and ultrasonic frequencies have appeared. Example sensors are MEMS microphones, which have a broad frequency response, including audio frequencies and ultrasonic frequencies.

The above-mentioned PCT Patent Application No. IB 2008/050946 of Altman et al, having common inventors with the present invention, describes how to use a MEMS microphone for both audio and ultrasonic applications. The present invention relates to the use of such microphones.

In an embodiment of the invention, in order to benefit from the broad frequency response of the sensors, one embodiment of the invention uses two filters, one filter for ultrasonic pickup, and one filter for sonic pickup. Filtered signals are processed by a processor configured to implement an audio application, an ultrasonic application, or both.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The term "sensor" in all its grammatical forms is used throughout the present specification and claims interchangeably with the term "microphone" and its corresponding grammatical forms.

It is to be noted that many types of sensors transform vibrations into electronic signals, and any of them can serve as sensors in the invention. A non-limiting list of such sensors includes ceramic sensors, piezoelectric sensors, PVDF (Polyvinylidene Flouride) sensors, electro-static sensors, and so on.

The term "sonic" in all its grammatical forms is used throughout the present specification and claims interchangeably with the terms "voice" and "audio" and their corresponding grammatical forms. The term "ultrasonic" is used throughout the present specification and claims for sound frequencies higher than sonic frequencies. Usually ultrasonic is defined as frequencies above 20 KHz Reference is now made to FIG. 1, which is a simplified block diagram of an example embodiment of the invention, using a microphone which picks up both audio and ultrasonic signals.

The example embodiment of FIG. 1 comprises a microphone 105, a filter 101, a sonic signal processing unit 106, and an ultrasonic signal processing unit 107.

The microphone 105 is sensitive to both sonic and ultrasonic sound frequencies. A non-limiting example of such a microphone is a MEMS microphone such as described above.

The microphone 105 is connected to, and produces signals which are input to, a filter 101. The filter 101 sends output of audible frequency signals 102 to the sonic signal processing unit 106, and output of ultrasonic frequency signals 103 to the ultrasonic signal processing unit 107.

The sonic signal processing unit 106 optionally implements audible, or voice, applications.

The ultrasonic signal processing unit 107 optionally implements ultrasonic applications.

It is to be noted that a response of the microphone 105 may be substantially different in the audible range and in the ultrasonic range. When such is the case, amplifying the lower of the responses is performed.

In some embodiments of the invention the amplification is performed before the audible and ultrasound frequencies are separated, by an amplifier configured to perform different amplification for the different frequency ranges. In other embodiments of the invention the amplification is performed after the audible and ultrasound frequencies are separated.

Differences of 40 dB and more in sensitivity of the sensor to the ultrasonic and audible frequency range, where sensitivity is defined as Volt/Pascal, can be compensated for by the above-mentioned amplification.

Figure 2:
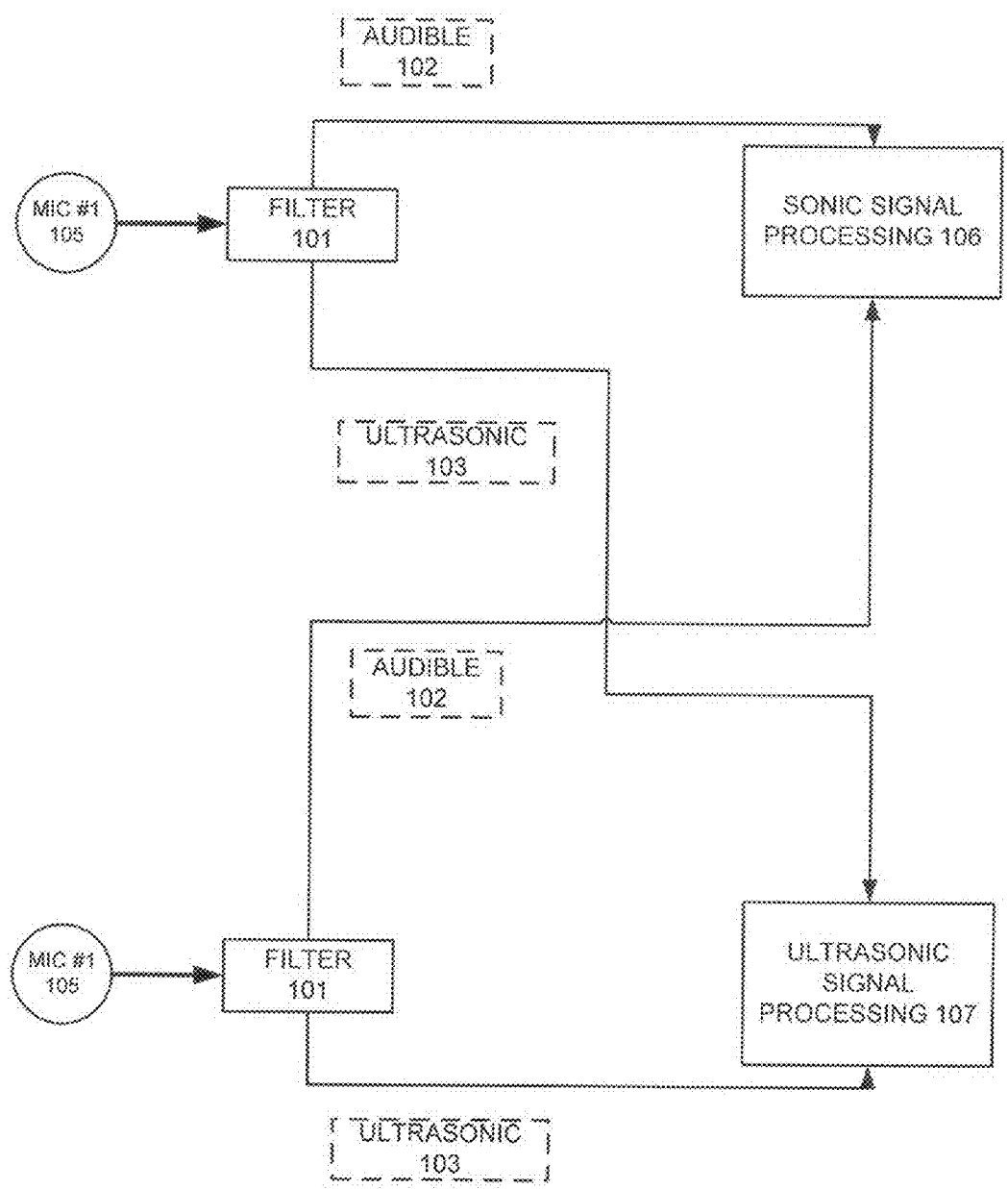
FIG. 2 is a simplified block diagram of an alternative example embodiment of the invention, using two microphones which pick up both audio and ultrasonic signals.

Reference is now made to FIG. 2, which is a simplified block diagram of an alternative example embodiment of the invention, using two microphones which pick up both audio and ultrasonic signals.

The example embodiment of FIG. 1 comprises two microphones 105, two filters 101, a sonic signal processing unit 106, and an ultrasonic signal processing unit 107.

The two microphones 105 are as described above, with reference to FIG. 1.

Each of the two microphones 105 is connected to, and produces signals which are input to, a corresponding one of the two filters 101. Each one of the filters 101 sends output of audible frequency signals 102 to the sonic signal processing unit 106, and output of ultrasonic frequency signals 103 to the ultrasonic signal processing unit 107.

The sonic signal processing unit 106 optionally accepts audible frequency signals 102 from the two microphones 105, and optionally implements audible, or voice, applications. A non-limiting example of such an audible application is a voice compression/transmission application. Another non-limiting example of such an audible application is a noise cancellation application. Another non-limiting example of such an audible application is a speaker localization application, or an audible noise source localization application.

The ultrasonic signal processing unit 107 optionally accepts the ultrasonic frequency signals 103 from two microphones, and optionally implements ultrasonic applications. Non-limiting examples of such ultrasonic applications are a stylus localization application and a stylus tracking application.

It is noted that the two microphones 105 may not have equal responses to input sound, whether sonic or ultrasonic. Some embodiments of the invention perform measurement and subsequent calibration of the response of the microphones 105 relative to each other, thereby enabling better accuracy to applications than if the microphones 105 are not calibrated.

It is noted that each of the microphones 105 may not itself provide a linear response to input sound, whether sonic or ultrasonic. Some embodiments of the invention perform measurement and subsequent calibration of the response of the microphones 105, thereby enabling better accuracy to applications than of the microphones 105 are not calibrated.

It is noted that in some embodiments of the invention, the microphones 105 provide a substantially linear input signal, making the calibration process simple or even unnecessary.

It is noted that calibration is also performed for reasons other than linearity. Non-limiting examples of additional causes for calibration are: different phase response of the microphones; different spatial response of the microphones such as different response for sound received from different directions; and difference in mechanical environment of each of the microphones.

Figure 3:
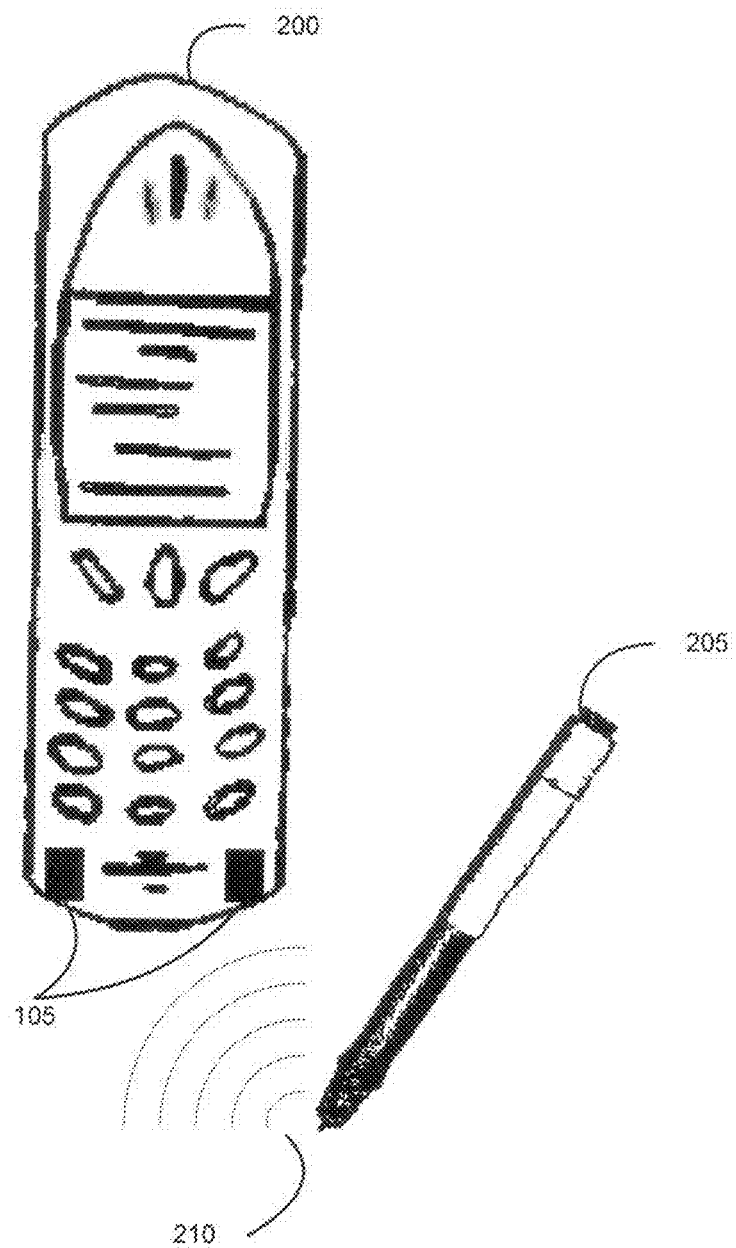
FIG. 3 is a simplified image of a system combining voice pickup and stylus localization using the invention of FIG. 1.

Reference is now made to FIG. 3, which is a simplified image of a system combining voice pickup and stylus localization using the invention of FIG. 1.

The system of FIG. 3 comprises a cell phone 200 comprising two microphones 105 and a stylus 205.

The two microphones 105 are as described above, with reference to FIG. 1.

At least one of the microphones 105 serves the cell phone 200 for sound pickup for performing a telephone conversation. Typically one microphone is enough for picking up a telephone conversation. Optionally, both of the microphones 105 are used.

The two microphones 105 also serve as ultrasonic pickups for an ultrasound transmitter (not shown) comprised in the stylus 205. The ultrasound transmitter (not shown) emits ultrasonic sound 210 which is picked up by the two microphones 105.

The cell phone 200 comprises an embodiment of the invention of FIG. 1, and a stylus localization application such as described in the above-mentioned PCT Patent Application No. IB 2008/050946 of Altman et al.

An alternative embodiment of the system of FIG. 3 additionally comprises a noise cancellation system, which uses both of the microphones 105 in order to emphasize a source of a voice from a speaker's direction, and de-emphasizes noise from other directions.

It is noted that more than two microphones are used in some alternative embodiments of the invention.

An embodiment comprising three or more microphones is optionally used for three dimensional localization of the ultrasound transmitter (not shown) comprised in the stylus 205.

It is noted that an alternative embodiment of the system of FIG. 3 comprises an array of microphones. A DSP (not shown) receives signals from the array, improving accuracy of the localization compared to two microphones.

It is noted that when an embodiment of the invention with one microphone is used, the localization of a sound source optionally provides a distance from the invention to the sound source.

When two microphones are used, the localization of the sound source is optionally in two dimensions, defining a two-dimensional surface in which the sound source is located. However, two microphones optionally estimate a DOA (Direction of Arrival) of the ultrasonic sound and/or the audible sound.

An alternative embodiment of the invention comprises a synchronizing mechanism, optionally using a different technology to communicate synchronizing information to an embodiment of the invention. The communication is optionally done, by way of a non-limiting example, by wired communication, such as an electric connection, or by wireless communication, such as an IR and/or RF communication. The synchronizing mechanism optionally enables measuring a distance to each of the sensors, thereby enabling triangulation in order to localize the sound source.

When four or more microphones are used, the localization is optionally in three dimensions, such as providing a direction and a distance from the invention to the sound source, or distance along three axes.

Figure 4:
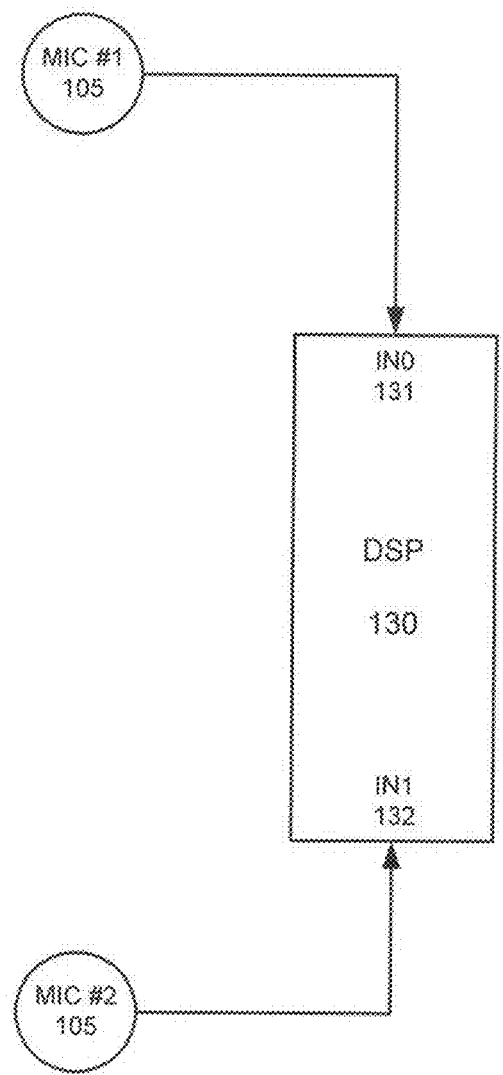
FIG. 4 is a simplified block diagram of another example embodiment of the invention of FIG. 1.

Reference is now made to FIG. 4, which is a simplified block diagram of another example embodiment of the invention of FIG. 1.

The example embodiment of FIG. 4 comprises two microphones 105 and a DSP 130.

The microphones 105 are as described above with reference to FIG. 1.

The microphones 105 are each connected to an input 131 132 of the DSP 130. The DSP 130 comprises an analog to digital converter with enough speed and dynamic range to convert both sonic and ultrasonic signals to digital.

It is to be noted, with reference to some embodiments of the invention, that an optional amplifier amplifies the microphone signals before A/D (analog to digital) conversion. By way of example, the A/D conversion of the embodiment of FIG. 4 occurs in the DSP 130, therefore the amplification optionally occurs on the DSP 130, before the A/D conversion. By way of another example, the filter 101 of FIG. 1 optionally implements amplification.

In an embodiment of the invention the DSP 130 optionally performs filtering of incoming signals, in the digital domain, to a sonic frequency range or an ultrasonic frequency range. The DSP 130 subsequently optionally implements processing of the filtered signals for a sonic application or an ultrasonic application.

In some embodiments of the invention the DSP 130 optionally implements processing of one of the above-mentioned applications, and subsequently implements processing the other of the above-mentioned applications. The DSP 130 optionally switches between the sonic and ultrasonic ranges periodically, and implements both applications one after another at a rapid rate.

In an alternative embodiment of the invention, the DSP 130 optionally performs rate conversion on at least one of the frequency bands, audible and sonic, before processing signals of the rate converted frequency band.

In an alternative embodiment of the invention, the DSP 130 optionally processes sonic and ultrasonic applications at the same time.

Figure 5:
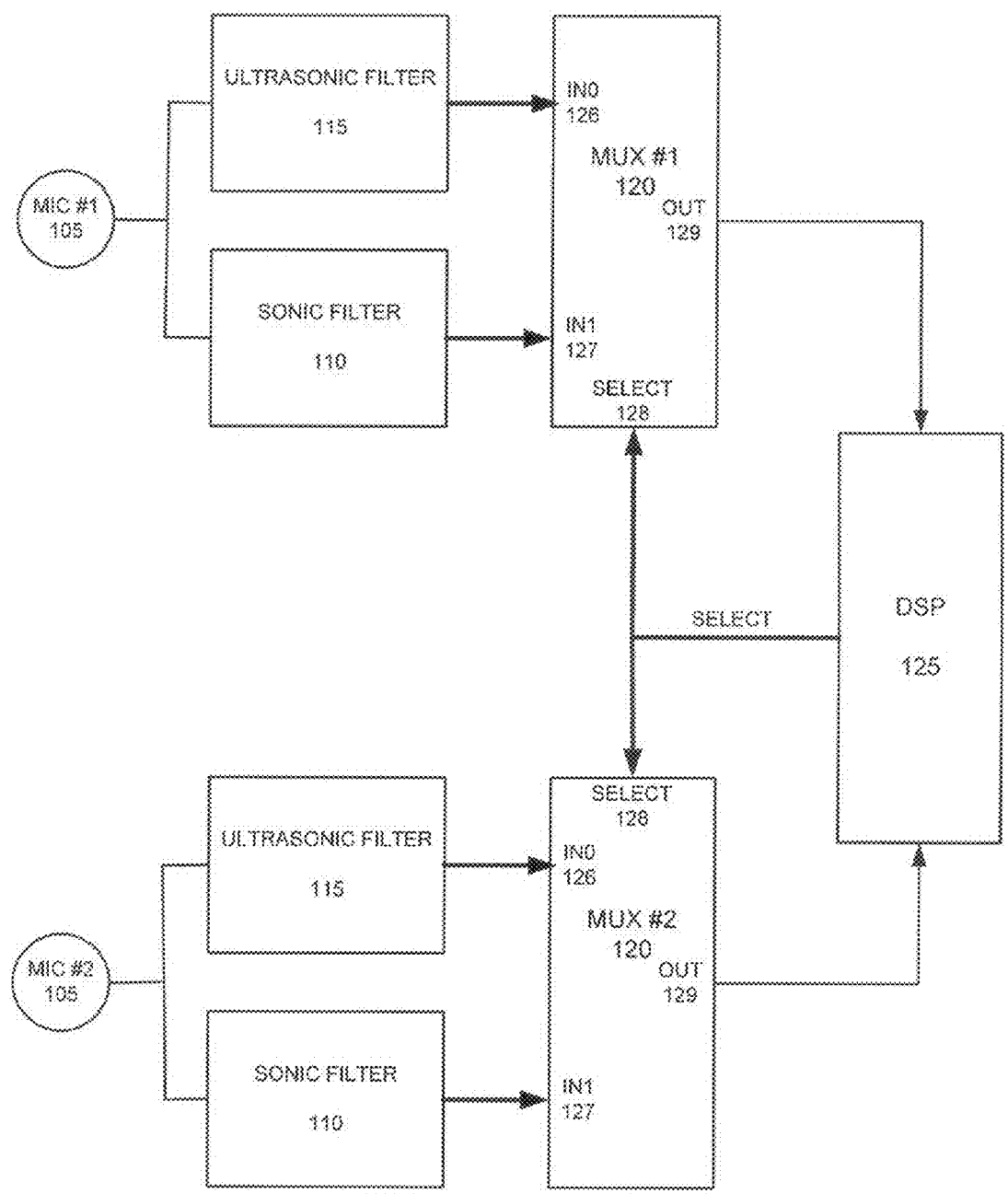
FIG. 5 is a simplified block diagram of a yet another example embodiment of the invention of FIG. 1.

Reference is now made to FIG. 5, which is a simplified block diagram of a yet another example embodiment of the invention of FIG. 1.

The example embodiment of FIG. 5 comprises two microphones 105, two analog sonic filters 110, two analog ultrasonic filters 115, two multiplexers 120, and a Digital Signal Processor (DSP) 125.

The two microphones may be similar to the microphones 105 of FIG. 1A, being sensitive to both sonic and ultrasonic signals.

The microphones 105 are each connected to one of the analog sonic filters 110 and one of the analog ultrasonic filters 115, and provide input to the analog filters 110 115. The analog filters 110 115 are each connected to one of the multiplexers 120.

The multiplexers 120 provide output to the DSP 125. The DSP 125 provides control signals to the multiplexers 120, selecting which of the sonic or the ultrasonic signals the multiplexers 120 should provide as output at any time.

Operation of the example embodiment of FIG. 5 is now described.

The microphones 105 pick up sound signals and provide the sound signals as input to the analog filters 110 115. The sound signals may be audio signals, ultrasonic signals, and both audio and ultrasonic simultaneously.

The analog ultrasonic filters 115 pass through ultrasonic signals. The analog sonic filters 110 pass through sonic signals.

The ultrasonic signals are passed to inputs 126 of the multiplexers 120, and the sonic signals are passed to inputs 127 of the multiplexers 120.

The multiplexers 120 provide output of either a sonic signal or an ultrasonic signal, through outputs 129, based on select signals 128 to the multiplexers 120. The select signals 128 are provided to the multiplexers 120, by the DSP 125. The DSP 125 thus controls whether to accept an ultrasonic signal or a sonic signal, optionally based upon whether the DSP 125 is at that moment processing signals for a voice application or for an ultrasonic application.

It is noted that in alternative embodiments of the invention the analog sonic filter 110 and/or the analog ultrasonic filter 115 may be digital filters.

It is noted that in some embodiments of the invention, the microphones 105 and the analog filters 110 provide a substantially linear input signal to the DSP 125, making calibration simple or even unnecessary.

In yet other alternative embodiments of the invention two DSP units, one for an audible application, and one for an ultrasonic application, are included.

Figure 6:
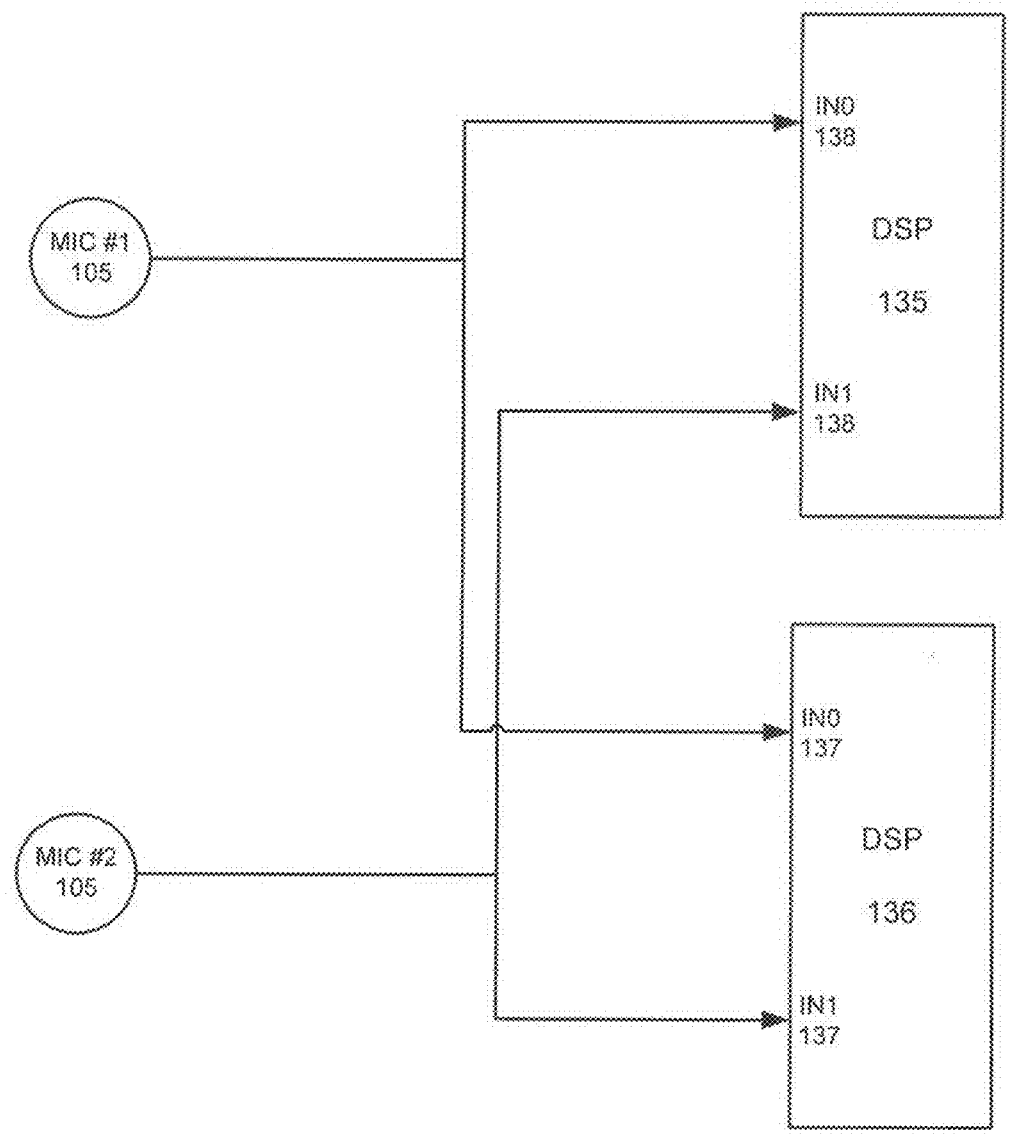
FIG. 6 is a simplified block diagram of a still another example embodiment of the invention of FIG. 1.

Reference is now made to FIG. 6, which is a simplified block diagram of a still another example embodiment of the invention of FIG. 1.

The example embodiment of FIG. 1C comprises two microphones 105 and two DSPs 135 136.

The two microphones 105 are optionally similar to the microphones 105 of FIG. 1. Each of the microphones 105 is optionally connected to inputs 137 138 of both of the DSPs 135 136.

The DSPs 135 136 each optionally comprises an analog to digital converter with enough speed and dynamic range to convert both sonic and ultrasonic signals to digital. One of the DSPs 135 performs filtering of the inputs 138 to accept an ultrasonic signal, thereby supporting an ultrasonic application, and the other of the DSPs 136 performs filtering of the inputs 137 to accept a sonic signal, thereby supporting a sonic application.

Example applications which use the ability to process both audible and ultrasonic sound sources are described, by way of non-limiting examples, below.

Stylus Localization

Apparatus which includes one or more microphones are enabled by the invention to include a stylus localization application. For example, laptop computers and computer displays often include a microphone. By way of another example, cell phones have a microphone as a necessary part of their operation.

Equipment Monitoring

Various kinds of equipment emit noise while operating. The noise is typical of the operation of the equipment, and the noise spectrum characterizes the operation. A non-limiting example of such equipment can be a fan. Rotating machines especially produce a noise spectrum which is typically composed of noise in the frequency at which the machine rotates, and higher harmonics of that noise.

Monitoring noise of machines while they are operating, and tracking the spectrum of the noise, allows the monitor to differentiate between normal operation, and abnormal operation, which generates a changes noise spectrum.

Embodiments of the present invention optionally monitor machine operation noise both in the sonic range and in the ultrasonic range, producing a richer than usual operation noise spectrum. The monitor optionally enables indication of abnormal operation, based on an abnormal noise spectrum. The monitor also optionally indicates a direction from the monitor to the abnormally operating machine, based on using two microphones. The monitor also optionally indicates a location of the abnormally operating machine, based on a direction and a distance to the machine, by using three or more microphones.

A particularly intriguing application is having an equipment monitoring capability in a cell phone, by using the present invention.

Distance Measurement

As described in PCT Patent Application No. IB 2008/050946 of Altman et al, ultrasonic sensitive microphones enable an ultrasonic acoustic positioning system.

Presently available equipment which presently uses microphones for other uses, such as, by way of a non-limiting example video cameras and still cameras with microphones, can now be made to measure distance. By comprising the present invention and adding an ultrasonic sound source, the enhanced equipment can bounce ultrasonic sound off obstacles, and process the returned ultrasonic sound. In some embodiments of the invention the distance measurement is performed with one MEMS microphone. In other embodiments of the invention the distance measurement is performed with two or more MEMS microphones.

One use contemplated for the invention is as part of a focusing unit of a camera.

Detection and Location of Animals

Some animals emit noise in an ultrasonic range. The present invention can provide a detection capability of these animals to apparatus which usually contains microphones, such as the above mentioned cameras, or to directional microphones.

Apparatus which to date has been used for sonic use can be enhanced by using the present invention for detection of animals characterized by their ultrasonic emissions.

An embodiment of the invention enables pointing out a direction to the above-mentioned animals, and pointing out both direction and distance to the animals.

A particularly intriguing application is having an animal detection capability in a cell phone, by using the present invention.

It is noted that a one-microphone animal detection application optionally simply indicates the presence of the sound emitting animals, while an application with more than two microphones optionally indicates a direction and optionally indicates a distance to the sound emitting animals.

A Three Dimensional Mouse

An embodiment of the invention using three or more microphones provides localization in three dimensions. By embedding an ultrasonic sound source in a computer mouse, a three dimensional mouse is provided. Activating an actuator on the mouse, such as pressing a button on the mouse, starts a process of tracking the mouse through three dimensions. Providing three dimensional input via the mouse to a computer enables three dimensional applications in the computer.

A particularly intriguing application is having a three dimensional mouse input into a cell phone, by using the present invention.

Recording Sound and Processing Stylus Input Simultaneously

An embodiment of the invention uses the sonic and ultrasonic capabilities of the microphone to simultaneously record sound and track a stylus containing an ultrasonic sound source. By tracking the stylus, the embodiment provides input to a writing application.

An example use of the embodiment is during a meeting, recording all that is said in the meeting while also recording notes written by the stylus.

Another example use is during a conference call, recording all sides of the call, while transferring notes written by the stylus at one location to one or more remote locations.

It is noted that embodiments of the invention can be present at different locations of a conference call, transferring the written content from each of the locations to the other locations.

A particularly intriguing application is having the above mentioned conference call performed by a cell phone, by using the present invention.

Processing More than One Ultrasonic Sound Source at a Time

As described in PCT Patent Application No. IB 2008/050946 of Altman et al, more than one ultrasonic sound source can be tracked at a time, for example by using different ultrasonic frequencies.

Alternatively, the sensors are arranged orthogonally to each other, as described in PCT Published Patent Application WO 03/088136 of Altman et al, which has some common inventors with the present invention. The arrangement also enables tracking more than one ultrasonic sound source at a time.

An embodiment of the present invention therefore tracks more than one ultrasonic sound source at a time, for example, more than one stylus at a time. The movements of the different styli optionally provide input for tracking several users writing notes.

Touch-Screen Applications

When a stylus containing an ultrasonic sound source is tracked, the tracking is optionally provided as input to additional applications, such as, by way of a non-limiting example, writing applications. The stylus can also provide input as a mouse, with the tracking of the stylus causing a corresponding movement of a cursor in a computer application. An embodiment of the application optionally provides input to touch-screen applications. In a touch-screen application, not only is the movement of the stylus translated to movement of a cursor, but additionally the cursor is located where the stylus touches the touch-screen, and the cursor moves so that it follows the stylus on the touch-screen.

Locating Tags emitting Ultrasonic Sound

An embodiment of the invention locates tags emitting ultrasonic sound. The embodiment enables finding the tags, which are optionally attached to objects in order to enable finding the objects.

The ability to locate more than one ultrasonic sound source enables differentiating between tags.

An alternative embodiment includes an emitter which sends a signal to the ultrasonic sound emitting tags, thereby causing the tags to emit ultrasonic sound only when signaled to do so.

A particularly intriguing application is having the above mentioned tag location performed by a cell phone, by using the present invention.

It is expected that during the life of a patent maturing from this application many relevant microphones capable of both sonic and ultrasonic pickup will be developed, and the scope of the terms microphone and MEMS microphone are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a unit" or "at least one unit" may include a plurality of units.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus configured for processing of both audible and ultrasonic sound inputs, comprising:
    a sensor with a frequency response spanning both audible and ultrasonic frequencies; and
    processing electronics configured to separate the audible and ultrasonic input frequencies for independent use, and comprising a first filter configured to filter audible frequencies and a second filter configured to filter ultrasonic frequencies and a multiplexer for switching between the separated frequencies to provide a single output, the multiplexer allowing for simultaneous processing, by the processing electronics, of audible and ultrasonic frequencies output from the sensor, the processing including performing noise cancellation.

2. The apparatus of claim 1 in which the frequency response of the sensor is substantially different in the audible frequencies and in the ultrasonic frequencies.

3. The apparatus of claim 2 in which the frequency response of the sensor in the audible frequency differs by more than 40 dB than the frequency response of the sensor in the ultrasonic frequencies.

4. The apparatus of claim 3 in which the processing electronics is configured to amplify a lower one of a response of the sensor to the audible frequencies and a response of the sensor to the ultrasonic frequencies.

5. The apparatus of claim 1 in which the processing electronics comprises independent processing parts for independently processing the separated frequencies.

6. The apparatus of claim 1, comprising two or more sensors.

7. The apparatus of claim 1, in which a same sensor is used for picking up the audible and the ultrasonic sound inputs.

8. The apparatus of claim 1, in which the sensors are MEMS microphones.

9. The apparatus of claim 1, in which the processing electronics is configured for localization of at least one source of the ultrasonic sound input.

10. The apparatus of claim 1, in which the processing electronics is configured for localization of at least one source of the audible sound input.

11. The apparatus of claim 1, in which the processing electronics is configured to localize an ultrasonic sound source in three dimensions by comparing the ultrasonic output of more than one sensor.

12. The apparatus of claim 1, in which the processing electronics is configured to track movement of the ultrasonic sound source.

13. The apparatus of claim 12, in which the processing electronics is configured to produce output corresponding to the tracking.

14. The apparatus of claim 1, and further configured for at least one member of the group comprising equipment monitoring, indicating location of faulty equipment, measuring distance, detecting animals emitting ultrasonic sounds, localizing animals emitting ultrasonic sounds, simultaneously recording sound and perform ultrasonic sound source localization, simultaneously recording sound and perform ultrasonic sound source localization wherein said ultrasonic source localization further comprises producing input to a writing application, simultaneously recording sound and perform ultrasonic sound source localization wherein said ultrasonic source localization further comprises producing input to more than one writing application, indicating location of tags emitting ultrasonic sound, and sending a signal to the tags in order to cause the tags to emit ultrasonic sound.

15. The apparatus of claim 14 comprised as part of a distance determination unit in a focusing unit of a camera.

16. The apparatus of claim 1, and further comprising an ultrasonic sound source.

17. The apparatus of claim 1, configured to perform ultrasonic sound source localization for more than one ultrasonic sound source.

18. Apparatus according to claim 1 and further comprising a touch-screen, in which placing a tip of a stylus on the touch-screen produces output corresponding to a location of the tip of the stylus on the touch-screen, and moving the tip of the stylus along the touch-screen surface produces output corresponding to the movement of the tip of the stylus along the touch-screen surface.

19. A system comprising
    a) apparatus configured for processing of both audible and ultrasonic sound inputs, comprising:
    a sensor with a frequency response spanning both audible and ultrasonic frequencies; and
    processing electronics configured to separate the audible and ultrasonic input frequencies for independent use, and comprising a first filter configured to filter audible frequencies and a second filter configured to filter ultrasonic frequencies and a multiplexer for switching between the separated frequencies to provide a single output, the multiplexer allowing for simultaneous processing, by the processing electronics, of audible and ultrasonic output frequencies from the sensor, the processing including performing noise cancellation; and b) a pointing device configured to emit ultrasonic sound.

20. The system of claim 19 in which the apparatus comprises three sensors and produces a localization of the pointing device in three dimensions.

21. An apparatus configured for processing of both audible and ultrasonic sound inputs, comprising:

first and second sensors each with a frequency response spanning both audible and ultrasonic input frequencies; and processing electronics configured to process each one of the audible and ultrasonic input frequencies independently, said processing comprising carrying out noise cancellation and location of a source with said ultrasonic sound input.

22. A method for processing of both audible and ultrasonic sound inputs, using a sensor with a frequency response spanning both audible and ultrasonic input frequencies for input of audible and ultrasonic sound inputs, and processing electronics for separating the audible and ultrasonic input frequencies for independent use, comprising filtering audible frequencies and ultrasonic frequencies separately and switching by multiplexing between the separated frequencies to provide a single output, the multiplexing allowing for simultaneous processing, by the processing electronics, of audible and ultrasonic frequencies output from the sensor, the processing including performing noise cancellation.

23. The method of claim 22, in which the sensor comprises more than one sensor, and further comprising calibrating the response to input from at least one of the sensors.

24. The method of claim 22 in which the processing electronics is configured for simultaneous processing of audible and ultrasonic frequencies.

25. A system for processing of both audible and ultrasonic sound inputs, comprising:

means for detecting the audible and ultrasonic sound inputs, the means for detecting the audible and ultrasonic sound inputs having a frequency response spanning both audible and ultrasonic frequencies;

means for filtering the audible and ultrasonic sound inputs to separate the audible sound input and the ultrasonic sound input for independent use;

means for multiplexing the separated audible sound input and the ultrasonic sound input to switch between the separated audible sound input and the ultrasonic sound input to provide a single output for simultaneous processing; and means for simultaneously processing the separated audible sound input and the ultrasonic sound input, the processing including performing noise cancellation.

26. A computer-readable medium including instructions that when executed by a processor causes the processor to perform a method comprising:

filtering audible and ultrasonic sound inputs detected using a sensor having a frequency response spanning both audible and ultrasonic frequencies to separate the audible sound input and the ultrasonic sound input for independent use;

multiplexing the separated audible sound input and the ultrasonic sound input to switch between the separated audible sound input and the ultrasonic sound input to provide a single output for simultaneous processing; and simultaneously processing the separated audible sound input and the ultrasonic sound input, the processing including performing noise cancellation.

\* \* \* \* \*